United States Patent [19]

Kay

[11] E Patent Number: Re. 32,252

[45] Reissued Date of Patent: Sep. 23, 1986

[54] METHOD OF AND APPARATUS FOR PROVIDING INFORMATION AS TO THE EXISTENCE OR POSITION OF OBJECTS

[76] Inventor: Leslie Kay, 82 Scarborough Road, Christchurch 8, New Zealand

[21] Appl. No.: 569,880

[22] Filed: Jan. 11, 1984

Related U.S. Patent Documents

Reissue of:

[64] Patent No.: 4,310,903
Issued: Jan. 12, 1982
Appl. No.: 68,432
Filed: Aug. 21, 1979

[30] Foreign Application Priority Data

Aug. 21, 1978 [NZ] New Zealand ..... 188192

[51] Int. Cl.[4] ..... G01S 15/34

[52] U.S. Cl. ..... 367/102; 367/113; 367/116; 367/910

[58] Field of Search ..... 367/102, 103, 104, 113, 367/116, 910

[56] References Cited

U.S. PATENT DOCUMENTS

| | | | |
|---|---|---|---|
| 2,536,771 | 1/1951 | Rost et al. | 367/102 |
| 2,724,817 | 11/1955 | Hisserich | 367/102 |
| 3,172,075 | 3/1965 | Kay | 367/102 |
| 3,337,839 | 8/1967 | Nelkin | 367/105 |
| 3,366,922 | 1/1968 | Kay | 367/102 |
| 3,594,823 | 7/1971 | Collins | 3/1 |
| 3,742,433 | 6/1973 | Kay et al. | 367/102 X |
| 3,794,964 | 2/1974 | Katakura | 367/102 X |
| 3,824,531 | 7/1974 | Walsh | 367/102 X |
| 3,918,025 | 11/1975 | Koshikawa et al. | 367/102 X |
| 4,020,446 | 4/1977 | Iida et al. | 367/138 |

FOREIGN PATENT DOCUMENTS

| | | |
|---|---|---|
| 1623491 | 9/1972 | Fed. Rep. of Germany . |
| 2333531 | 1/1974 | Fed. Rep. of Germany . |
| 2435666 | 2/1975 | Fed. Rep. of Germany . |
| 546202 | 7/1942 | United Kingdom . |
| 1210087 | 10/1970 | United Kingdom . |
| 1330351 | 9/1973 | United Kingdom . |
| 1415440 | 11/1975 | United Kingdom . |

OTHER PUBLICATIONS

L. Kay, "A Sonar aid to enhance spatial perception of the blind: engineering design and evaluation", Radio and Electronic Engineer, vol. 44, No. 11, pp. 605–627 Nov. 1974.

*Primary Examiner*—Richard A. Farley
*Attorney, Agent, or Firm*—Spencer & Frank

[57] ABSTRACT

A method of and apparatus for locating an object by stress wave energy reflection in which the wave energy is transmitted as a beam by transmitting transducer elements, and is scanned through successive sectors of a field of view by imposing differential transmission delays on transmitting signals fed to the elements by means of a delay line. Indicator signals are developed in receiving channels connected respectively to receiving transducers providing binaural characteristics, and transducer providing monaural characteristics but collectively covering the field. An indicator means comprises any, or any combination, of audible means, visual means or tactile means the two latter providing coordinate displays. A receiving means includes spectral analysing means for segregating the indicator signals into separate different frequency bands, and delay means for imposing differential delays compensating for transmit time of wave energy reflection in the medium correlated with different range bands before coordinate display.

17 Claims, 5 Drawing Figures

METHOD OF AND APPARATUS FOR PROVIDING INFORMATION AS TO THE EXISTENCE OR POSITION OF OBJECTS

Matter enclosed in heavy brackets [ ] appears in the original patent but forms no part of this reissue specification; matter printed in italics indicates the additions made by reissue.

BACKGROUND OF THE INVENTION

This invention relates to a method of and apparatus for providing information as to the existence or position of objects otherwise than by direct vision.

More specifically a method to which the invention relates (hereinafter referred to as being of the kind specified) comprises the steps a radiating stress wave energy (herein called the transmitted signal) from a station to a field of view, receiving at the station at least part of the transmitted signal (such part herein being called the received signal) reflected from the object, carrying out a frequency modulation of the transmitted signal to produce a frequency difference between the received signal and a correspondingly frequency modulated locally generated signal in a mode such that the magnitude of the frequency difference represents the range of the object from the station, operating upon the received signal with the locally generated signal to produce an indicator signal of said difference frequency providing for range indication, and determining or sensing the angular position of the object with respect to a reference axis extending through the station and the field of view by observation of a characteristic of the indicator signal which is dependent upon the angular position of the object.

The apparatus to which the invention relates (hereinafter referred to as being of the kind specified) comprises a transmitting means for transmitting frequency modulated stress wave energy (herein called the transmitted signal) from a station to a field of view, receiving means at the station for receiving at least part of the wave energy (this part herein being called the received signal) reflected from an object in the field of view, modulator means for producing a frequency difference between the received signal and a correspondingly frequency modulated locally generated signal, said frequency modulation being in a mode such that the magnitude of the frequency difference is representative of the range of the object from the station, means for providing the locally generated signal and for feeding same to said modulator means to produce therefrom an indicator signal of said difference frequency, and indicator means responsive to said indicator signal to furnish observable range and direction information.

In both performance of the method and in the apparatus it is preferred that the stress wave energy shall be radiated at a frequency above audibility i.e. supersonic.

One form of apparatus of the kind specified for performing the method of the kind specified is disclosed in earlier developments of the present inventor published in U.S. Pat. Nos. 3,172,075 and 3,366,922 relating to a blind aid. In the latter, two receiving transducers on a head-set provide receptivities represented by divergent medially overlapping polar lobes, and signals received by these transducers are fed through channels in the receiving means providing audible difference frequency indicator signals to the left hand and right hand audio-transducers on the head-set. The polar lobe characteristics are designed to match the characteristics of the human auditory neural system so that a blind person wearing the head-set can sense the direction from which a reflection of the transmitted signal is received, and, of course, can also make a subjective determination of the range by virtue of the frequency of the indicator signal.

It has been recognized by the present inventor that radiation of very wide bandwidth frequency modulated waves, as disclosed in these earlier developments, provides an indicator signal which not only indicates distance and direction but carries information about the nature of the object. This information is in a form of tone complexes caused by multiple scattering, or by reflecting discontinuities of the object, and which arise from object shape, size, surface structure and in some cases from volume structure. For example an object in which volume structure is important is a shoal of fish. When the object or parts of the object move, the instantaneous velocity of each reflecting part resolved along the direction transmission of the stress wave, causes the re-radiated stress wave to change in frequency due to DOPPLER effect. This frequency change is transferred to the indicator signal, which is in the audible range, unaffected as regards the magnitude of the frequency change so that a small percentage change of the preferred supersonic radiation frequency will appear in the indicator signal as a significant and noticeable frequency change even though the actual positional change of the object may be slight. Such variation in the components of a tone complex, as well as the form of the tone complex itself characterise the object producing this complex and enable a skilled observer to recognize character of the object.

Surfaces of an object, which have a small separation along the direction of propogation can be observed using a pulse echo location system only if the pulse durations are of the order of half the transit time in the medium between the surfaces at their minimum separation and this entails a very wide bandwidth system. Further, the time interval beween radiated pulses would have to be greater than the transit time in the medium for objects at maximum range and would typically be of the order of one second for underwater applications. Change of position cannot be determined by a single echo, and the repetition frequency would be too low for the system to sample significant changes in position of the object.

The prior forms of apparatus referred make use of audible indicator means, indeed essentially so, where the characteristic of the human auditory neural system is to be simulated. There are, however, applications of methods and apparatus of the kind specified where other forms of indicator means may be advantageously employed, for example visual indicator means or tactile indicator means both providing sensually perceptible indications of range and direction. The purpose of the present invention, is to provide an improved method and apparatus by means of which object character recognition is enhanced when utilizing an aural indicator means, and which solves certain problems (more conveniently explained hereafter) which are entailed when visual or tactile indicator means are employed.

SUMMARY OF THE INVENTION

According to one aspect of the present invention a method of the kind specified includes the improvement comprising the steps of radiating stress wave energy into the field of view in the form of a beam, moving the beam angularly from a datum position occupied at a datum time to effect scanning of the field of view successively to irradiate objects contained in successive sectors of the field of view having angular widths corresponding to that of the beam, and displaying indicator signals derived from the received signals due to these objects in a mode providing an indication of the sector of the field of view in which the beam is located when irradiating each object.

A further feature of the method is that the display of the indictor signal may include providing sensually perceptible stimuli spaced apart in one dimension in a manner corresponding to the scanning position of the beam, and spaced apart in another dimension in a manner corresponding to the range of the object. Thus, one form of display of this character may be visual employing stimulation of the face of a cathode ray-tube, and another form may be stimulation of a matrix of tactile elements such as vibratory pins arranged in rows corresponding to different ranges and columns corresponding to different sectors of the field.

When displaying sensually perceptible stimuli, as stated, the method is preferably further characterized in that indicator signals due to objects at said different ranges are subjected, before producing the stimuli, to different delays to bring them into coincident time relation at different respective outlets. These outlets are subjected to sequential scanning to generate the respectively spaced stimuli.

According to a further aspect of the invention an apparatus for providing information as to the existence or position of objects comprises in combination a transmitting means for transmitting frequency modulated stress wave energy (herein called the transmitted signal) from a station to a field of view and including transmitting transducer means providing a beam, means providing a correspondingly frequency modulated locally generated signal, scanning means for moving the beam angularly from the datum position in the field of view to effect scanning of the field of view successively to irradiate objects contained in successive sectors of the field of view, such sectors having angular widths corresponding to that of the beam, receiving means at the station for receiving at least part of the wave energy (this part herein being called the received signal) reflected from an object in the field of view, modulator means for producing an indicator signal at a frequency equal to the frequency difference between the received signal and the locally generated signal, said frequency modulating being in a mode such that the magnitude of the frequency difference is representative of the range of the object from the station, means for feeding the received signal and the locally generated signal to the modulator means to produce therefrom said indicator signal of said difference frequency, and indicator means responsive to the frequency of said indicator signal to furnish observable range information, and responsive to the angular position of the beam to provide for sensory perception of a sector of the field of view in which the beam is located while irradiating each object.

The indicator means may comprise coordinate display means providing sensually perceptible stimuli spaced apart in a first dimension in a manner corresponding to the scanning position of the beam, and spaced apart in a second dimension in a manner corresponding to the range of the object.

Preferably the receiving means includes means for segregating indicator signals derived from received signals due respectively to objects at different ranges to different respective outlets of the receiving means one for each range band, means for subjecting the segregated indicator signal to delays differing in a manner such as to bring them into coincident time relation, and switch means for sampling said outlets successively to feed indicator signals therefrom to said coordinate display means along said second dimension.

If the indicator means provides, or includes, an audible display, character recognition arising from the different frequency components due to multiple reflections from object surfaces at different distances, and in some cases from movement of these surfaces, will be enhanced because of irradiation of the object by means of the narrow concentrated beam.

Moreover, it is a further feature of the apparatus that it may include means for arresting scanning of the beam at any desired position, and this enables the user to concentrate on character recognition of an object situated in a particular sector of the field of view without any distraction of indicator signals received on objects in other sectors. If more than one object should be present in a given sector, such objects would be resolved by a different basic frequency of indicator signal, of, if the objects were close to each other and resulting tone produced by two basic frequencies differing only slightly from each other would be recognised by a skilled observer.

When the display is visual or tactile, (intrinsically entailing the provision of coordinate display means providing sensually perceptible stimuli as aforesaid), the problem arises that the transit time of radiation outwardly through the field to an object and back again may be comparable with, or at least significant in relation to, the time taken for scanning of the transmitter beam from the datum position (corresponding to datum time) and the position of the beam in which it points towards the object. Thus, if no account were taken of the transit time in displaying the stimuli through the operation of the coordinate display means, it could happen that the stimulus representing a particular object could be displayed at a position along the first dimension (representing position of the beam) in advance of the proper position, because the beam would have moved on to this advanced position by the time the received signal arrived at the receiving means.

The problem is solved by effectively subtracting the transit time from an equation representing the time to move the scanning beam from the datum position to the direction of the object thus, in accordance with this feature of the invention respectively differing delays are applied to the indicator signals segregated to respective outlets (and each representing a particular range at which objects are situated).

If scanning were carried out relatively slowly as might be convenient where the invention is applied as a blind aid, then the transit time may not be significant and for that reason this feature is not regarded as necessarily one which need always be incorporated. However, if the scanning speed were such that the transit time were significant then this feature should be utilized.

The invention will now be described by way of example with reference to the accompanying drawings wherein.

Figure 1:
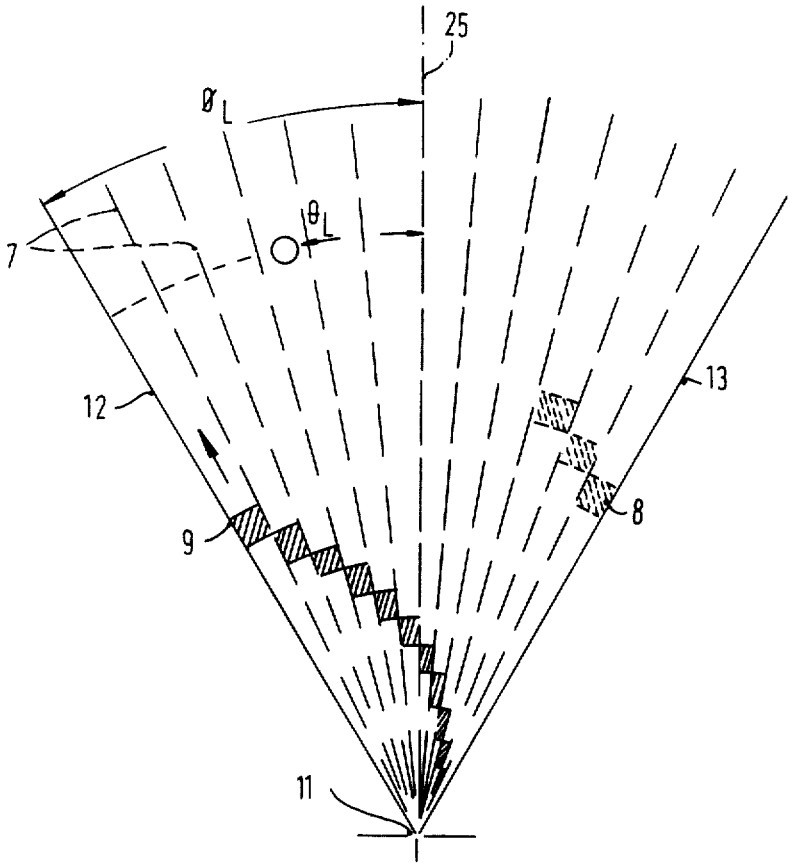
FIG. 1 is a diagrammatic view in plan illustrating energization of the field of view by a transmitted signal of a beam form which is scanned angularly across the field of view.
Figure 2:
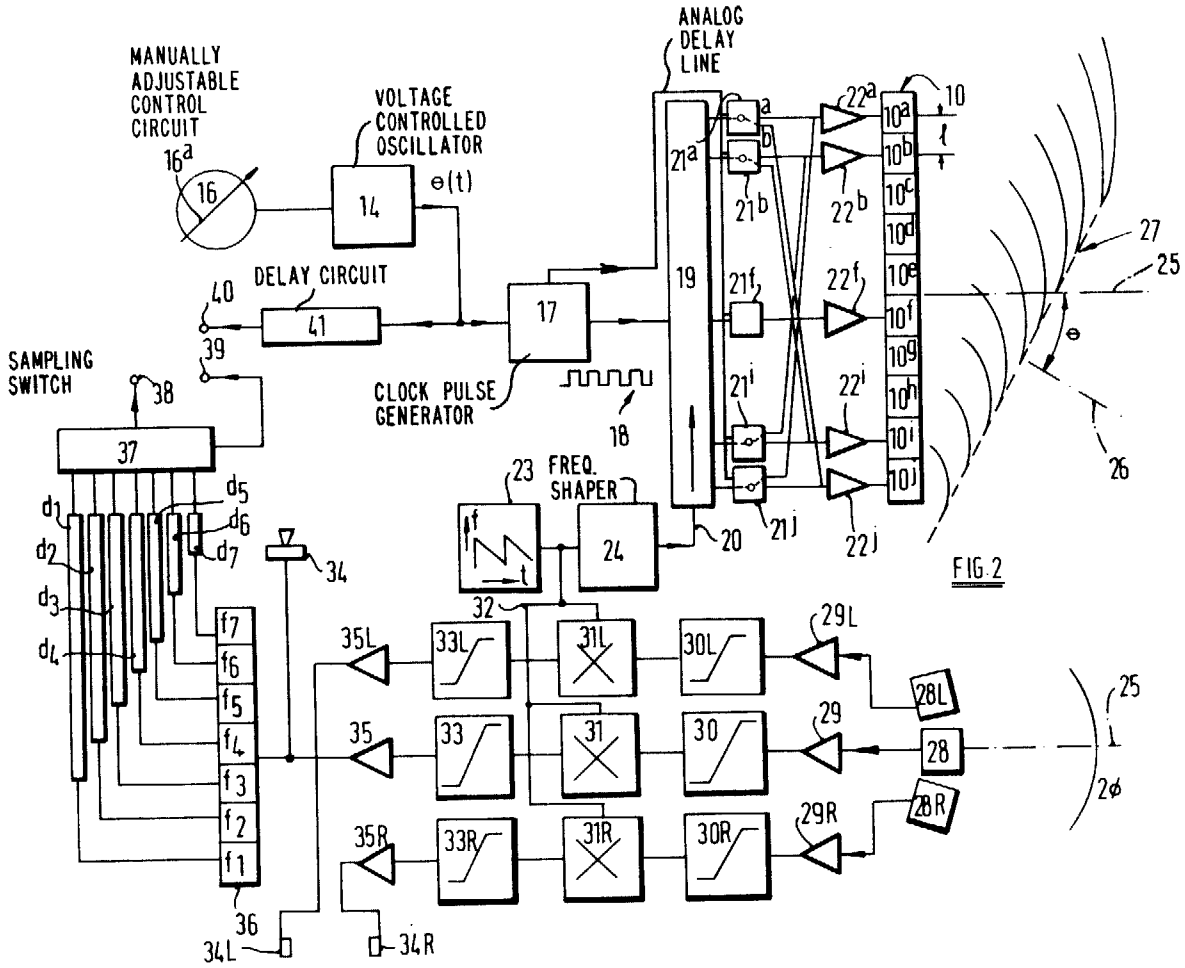
FIG. 2 is a schematic circuit diagram of one embodiment of apparatus in accordance with the invention.

Referring firstly to FIGS. 1 and 2 a multi-transducer element 10 comprising a strip array of transducer elements 10*a*, 10*j* is provided to radiate stress wave energy at supersonic frequency having a typical mid frequency value of 60 KHz into the environment of interest in the form of a narrow beam the effect of which is depicted in FIG. 1.

The latter shows a field of view having an origin 11 and radial-angular boundaries 12 and 13, and which is shown sub-divided into equal angular sectors corresponding to the angular width of the beam and denoted by dashed lines such as 7. For simplicity in the following description it will be assumed that the field of view, and motion of the beam hereinafter described, is in azimuth and that the beam having an angular width in the elevation of 20 to 40 degrees, but in practice the scan of the beam could be in any plane between horizontal and vertical, and the angular width of the beam in a plane of right angles to that in which scanning takes place could be greater or less than mentioned.

The apparatus includes means for causing the beam to scan angularly between boundary 12 and boundary 13 either stepwise, or continuously, and such scanning means comprises a voltage controlled oscillator 14 which generates a cycle wave form, the repetition rate of which is determined by the setting of an adjustable scanning control circuit 16, and the shape of which determines the mode of scan, e.g. stepped or continuous, and its direction. Amplitude of the wave form determines the angular extent of scan of the beam, with the instantaneous magnitude determining the angular position of the beam at any such instant, and repetition rate determines the repetition rate of scan of the beam.

The output of the oscillator 14 controls a further voltage controlled oscillator 17 which produces a series of square wave clock pulses indicated at 18 having a period proportional to $\theta$, and these pulses 18 are fed to an analogue delay line 19 which provides a series of incremental delays in an input signal fed into the delay line on conductor 20. Each increment is of a magnitude, or duration, dependent upon the subsisting value of the repetition rate of clock pulses 18. A typical delay line may be RETICON (registered trademark) TAD-32 Tapped Analog Delay manufactured by Reticon Corporation, particulars of which were published in 1977 in data sheets issued by that Corporation. The transducer elements 10*a* to 10*j* are connected respectively to elements of the delay line 19 so that at one end of the transducer array the signal reaching the element 10*j* is subjected to only one increment of delay whereas the signal reaching the transducer element 10*a* subjected to the aggregate of all the incremental delays along the line.

For stepped scanning, the output wave form from circuit 14 will be stepped so that the repetition rate of circuit 17 will rise (or fall) in steps. For continuous scanning the output wave form from circuit 14 will be a saw-tooth so that the repetition rate of the clock pulses 18 from circuit 17 rises continuously e.g. linearly and then reverts to the value subsisting when the beam is in its datum position.

To enable the user manually to position the beam, an adjustable scanning control circuit 16 includes control means designated generally by the arrow 16*a*. Such control means may be operable to adjust, to one or the other of two selected values, the level of output voltage of circuit 14 to circuit 17, and thereby enable the user to "bracket" the beam to centre it on an object before setting the voltage output of circuit 14 to a constant level to hold the beam in a fixed position. If desired a switch such as a push-button switch could be provided for manual operation to hold the value of output voltage instantaneously and stop beam scanning without prior "bracketing".

Connection between the elements of the delay line and respective transducer elements are made through the intermediary of electronic switch units 21*a* to 21*j*, and through power amplifiers 22*a* to 22*j*, (only certain of which units and amplifiers are shown for the sake of simplicity).

The switch units 21*a* to 21*j* each have two output terminals, shown typically in the case of unit 21*a* as a, b, and these are connected respectively to transducer element 10*a*, 10*j*. For other switch units the two corresponding output terminals are connected to respective transducer elements occupying corresponding positions at equal distances from the centre of a transducer array outwardly towards its ends.

The signals to be radiated are supplied through conductor 20 at a supersonic frequency, such as that already mentioned, and are derived from a transmitter signal generator or oscillator 23 which generates a frequency modulated output sweeping linearly from an upper frequency typically 80 KHz to a lower frequency 40 KHz in accordance with the falling saw-tooth wave form as shown in unit 23. The choice of midfrequency, sweep range, and sweep rate is dependent upon parameters such as the medium (air or water), transmitting and receiving transducer capabably as to bandwidth, and the maximum range required or attainable with the power output envisaged, but there should be at least one complete sweep of frequency for each sector of the field.

The output of the signal generator 23 is fed through a frequency shaping network 24 to the conductor 20. This frequency shaping network is frequency responsive and would typically be designed to increase the amplitude of the higher frequency components of the frequency modulated output from unit 23 relatively to the lower frequency components, since it is the higher frequency component which are more effective in imparting distinctive tonal characteristics in the indicator signal ultimately derived.

The transducer array 10 by reason of its length or the spacing of the transducer elements, intrinsically produces a narrow beam of radiation. Typically the angular width of the beam may be 5 degrees (that is to say its polar diagram will intersect with radius vectors at a 5 degree separation at points providing a 6 db reduction in power). Again, typically, the field of view may, as depicted in FIG. 1, be approximately 60 degrees. These angles however are intended to be illustrative rather than limiting, but in general terms it is contemplated that the angular width of the beam would be in the range 3 to 10 degrees so that a plurality of beam width would be contained in a typical field of view. When the pulse repetition rate of circuit 17 is at producing a maximum delay between elements of the delay line, the beam will be deflected to one boundary of the field of view. Insertion of the two-way electronic switch units 21*a* to 21*j* enables the quadrant of scan to be continued at medial position and reversed at the boundaries 12 and 13 through cross-connections, as shown, between the switches and the power amplifiers 22*a*, 22*j*. The clock pulse repetition rate determines the magnitude of the delay to each of the transducer elements 10*a* to 10*j*. When the delay is almost zero then each element 10*a* to 10*j* radiates the signal almost simultaneously and the median axis 26 of the beam is then almost coincident with the reference axis 25 passing medially through the origin of the field of view and also represented diagramatically in FIG. 2.

It is convenient to make the minimum delay between elements 10*a* to 10*g* (maximum clock pulse rate) correspond to the beam pointing one half a beam width to the left or right of the reference axis 25.

Stepped increases in the delay brought about by incidence stepped changes of the clock pulse repetition rate cause the median axis 26 of the beam be stepped left or right increasingly.

The clock pulse rate which is subsisting when the beam is pointing just to the left of the reference axis 25 is arranged through a direct connection from circuit 17 to change over the electronic switches 21*a*, 21*j*, so that further clock pulses then continue the stepping of the beam in the same direction, and the scan can be stepwise starting from boundary 12 and finishing at boundary 13 as shown in FIG. 1. A typical position of the wave front 27, representing maximum radiation is shown at an angle $\theta$ to the reference axis 25.

A time delay network namely the analogue delay line 19 is employed because a phase delay network cannot be operated over the wide frequency range of the radiated signal.

FIG. 1 depicts outwardly travelling "packets" 9 of wave energy in respective sectors showing that the field of view is energised in a manner analagously to supplying water through a hose-pipe moved stepwise. "Packets" 8 of energy represent certain of those radiated in a preceding scan.

Referring now to the receiving means of the apparatus, this includes receiving transducer means which may comprise three separate transducers 28L, 28R feeding left and righthand channels I, II of the receiving means, these transducers being spaced apart one on each side of a central receiving transducer 28 feeding receiver channel III. The receiver transducer means provides a polar diagram of sufficiently wide beam width to receive reflections from any object in the field of view, the transducers also having wide band width characteristics to ensure reception of received signals within the range of the transmitter frequency sweep.

The received signals are amplified in the three channels by amplifiers 29L 29R and 29, are subjected to frequency shaping in circuits 30L, 30R and 30 and are then fed to modulator circuits which may be product modulators 31L 31R 31. A locally generated signal having a swept frequency characteristic conforming to that of the transmitted signal is conveniently derived from the transmitter generator 23, and is fed as a separate input to the modulator circuits 31L 31R 31 on line 32.

The outputs from the modulator circuits 31L 31R 31, each of which includes filter means, comprises an indicator signal of difference frequency between the frequency of the received signal and the locally generated signal fed on line 32, and is therefore representative of the range of the object giving rise to the received signal, these indicator signals being fed in the channels to frequency responsive circuits 33L 33R 33.

The frequency shaping circuits 30L 30R and 30 are provided for the purpose of accentuating the frequency components which give rise to distinctive tonal qualities in the indicator signals, and therefore are designed to increase the magnitude of a higher frequency components or reduce the magnitude of the lower frequency components. Such frequency shaping could also be effected by the use alternatively, or in addition, of transmitting and/or receiving transducers having such characteristics.

The frequency responsive circuits 33L 33R and 33 are, on the other hand, to compensate for attennation in the medium through which the signal is transmitted and reflected, namely air or water. Since the attennation will be greater at longer ranges, corresponding to higher frequency indicator signals, again, these circuits are designed to increase the amplitude of the higher frequency component relatively to the lower frequency components or attenuate the latter.

The receiving means may include indicator means providing an audible display, and as shown this comprises sound reproducers, head-phones or stereo loud speakers 34L 34R, providing binaural display and fed respectively through amplifiers 35L 35 R in channels I, II. Further, a monaural display may be provided by a single sound reproducer namely a head-phone or loudspeaker 34 connected to the output of amplifier 35 in channel III.

Figure 3:
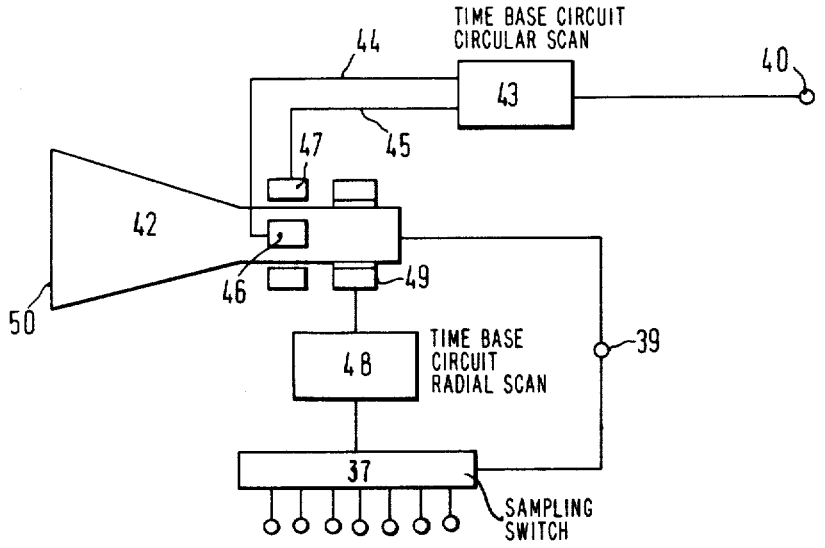
FIG. 3 is a schematic circuit diagram of one embodiment of coordinate display means providing visual stimuli and which may be used in combination with the apparatus of FIG. 2.
Figure 4:
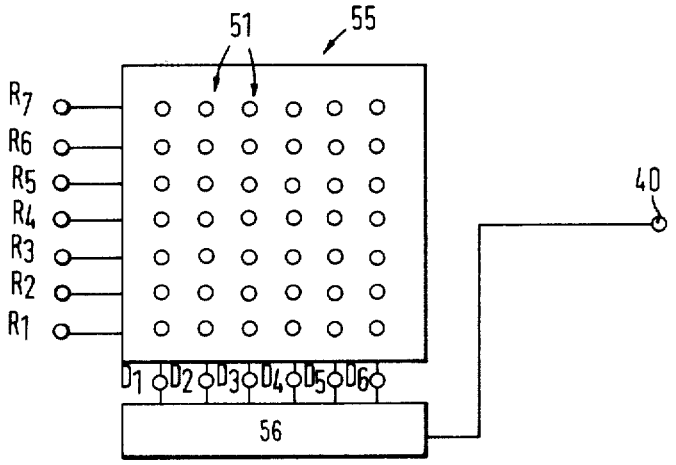
FIG. 4 is a schematic circuit diagram of a further form of coordinated display means providing tactile stimulation and which may be used in combination with the apparatus of FIG. 2.

Alternatively, or in addition, the indicator means includes coordinate display means providing sensually perceptible stimuli spaced apart in a first dimension in a manner corresponding to the scanning position of the beam, and spaced apart in a second dimension in a manner corresponding to the range of the object. Alternative forms of such display means are illustrated in FIGS. 3 and 4 the former comprising essentually a cathode ray-tube on the face of which a plan position indicator type of display is established, and the latter comprising a tactile display device intended for use by blind persons, or others in situations where coordinate display is required but visual presentation is not possible, or is inconvenient.

In both cases these displays may be regarded as duplicating or simulating analysing functions of the human cochlear and in particular that of discriminating between the different frequencies at which the indicator signals are developed.

For this purpose the receiving means may be provided with means for effecting spectral analysis into respective frequency bands. In the form shown these means comprise a bank of filters 36 designated f1 to f7 and each designed to pass a band of frequencies (the band may be substantially equal in each case), which differ from each other but collectively cover the whole range of frequency at which the indicator signals are developed. When an audible display means is also provided, this frequency range will be within audible limits, but in the absence of audible display means the frequency range could be wholly, or in part, outside the audible range.

This filter bank is fed from amplifier 35 in channel III, and individual filters are connected through the intermediary of respective delay units d1 to d7 to respective input terminals of a sampling means in the form of a switch 37. Filter f1 is assumed to pass the lowest pass band of frequencies corresponding to minimum range, and filter f7 the highest pass band of frequencies, representing the maximum range, the delays provided by the respective delay-units d1 to d7 being in descending order of delay that is d1 providing the greatest delay and d7 the least. This is to compensate for transit time of the signal out from the transmitting transducer means 10 and back to the receiver transducer means 28, as explained in more detail hereafter.

The sampling switch 37 has a range output terminal 38 which has a stepped signal output having a number of levels corresponding to the number of filters f1 to f7, and a signal output terminal 39 which is connected successively by the sampling switch 37 to each of the delay units d1 to d7 so the terminal 39 receives successive signals (when such are present) at the outlets of filters f1 to f7. Alternatively, the output of terminal 38 may be continuously rising (or falling) at the same average rate as the stepped output.

Further, the coordinate display means requires an input to develop direction indication, and this is derived from the saw-tooth generator 14 but requires to be delayed, and for this purpose in the output from the circuit 14 is supplied to direction terminal 40 through a delay circuit 41.

Referring now to the coordinate display means illustrated in FIG. 3 this comprises a cathode ray-tube 42 a time base circuit 43 providing outputs on lines 44 and 45 for application to deflector coils 46, 47 providing for circular (stepwise) deflection of the beam and a time base circuit 48 providing a stepped staircase output to deflection coil 49 for radial deflection of the beam. Alternatively the output to the deflector coils 46,47 may be continuous but change at the same average rate as the stepped output.

The time base circuit 43 is controlled by an input from terminal 40, and the time base circuit 48 is controlled by an input from the range terminal 38 of scanning switch 37. The signal terminal 39 of the scanning switch is connected to an electrode of the cathode ray-tube producing incidence of a bright spot on the screen 50 whenever a signal is present at terminal 39.

Figure 5:
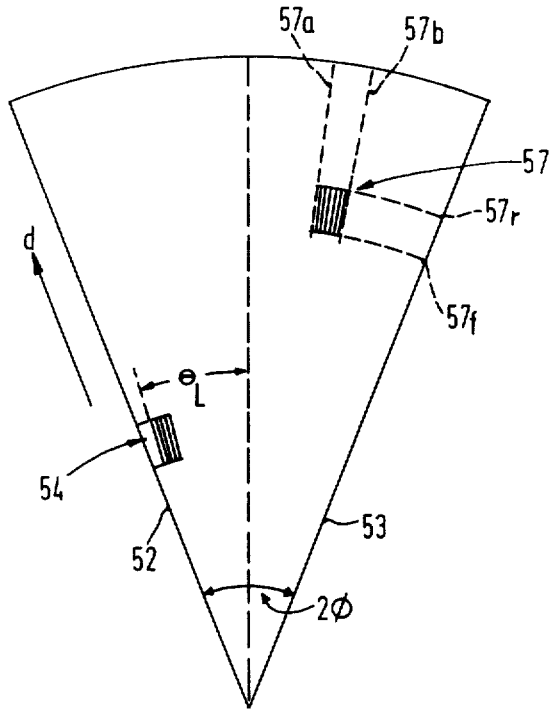
FIG. 5 illustrates a typical visual display by the use of the apparatus shown in FIGS. 2 and 3.

FIG. 5 illustrates a portion of the screen 50. The angular boundaries 52 and 53 correspond the angular bondaries 12 and 13 of the field of view and a visual stimuli in the form of bright spots (areas) are shown respectively at 54, 57 derived from the received signals due to typical objects at the angular positions and ranges shown.

Brightening would be achieved over "spots" situated more or less centrally of the areas bounded by radial lines 57*a*, 57*b* and arcs 57*f* 57*r* if the time bases provided stepwise scanning, and over the area if the time bases provided continuous scanning by the cathode ray-tube beam.

Referring to FIG. 4 this illustrates diagramatically a coordinate display unit which the stimuli are observable by touch. Devices of this form have been developed by C. C. Collins and details published in a paper entitled "Tactile vision synthesis in visual prosthesis—the interdisciplinary dialogue (ed Sterling T. D. et al) Acadamic Press 1971".

Unit 55 shows a matrix of tactile stimulator elements 51 arranged in horizontal rows representing range and vertical columns representing direction. For simplicity six stimulators are shown in each row and seven in each column but larger numbers may be used. The stimulators may be pin-like elements vibrated longitudinally by solenoid means energized whenever signals are concurrent at input terminals in the group R1 to R7 pertaining respectively to increasing ranges, and in the group D1 to D6 denoting respective and successive sectors of transmitter beam position.

Terminals R1 to R7 may be connected directly the output terminals of the delay-units d1 to d7. Terminals D1 to D6 are connected to respective outlet of circuit 56 which is the equivalent of a stepped time base circuit in that, in response to input from terminal 40 of the circuit FIG. 2, it developes energizing pulses incident successively terminals D1 to D6 of the duration of beam well in each scanning position.

The unit 55 includes suitable driving circuits for the solenoids to produce vibration of the associated pin. Thus whenever a horizontal row connected to a terminal in the group R1 to R7 and a vertical column connected to a terminal in the group D1 to D6 are energized, the pin contained in both the row and the column will be vibrated and will provide a sensation which can be perceived by the user conveying both range and direction information.

In practice the unit 55 may be strapped or otherwise secured to any sensitive part of the user's skin for example the abdomen.

In general terms performance of the method by means of the apparatus will be evident from the foregoing description. However, following further information is given as more fully disclosing certain features of the method.

It is assumed that the arc of scan of the transmitted beam is $\phi$ degrees on each side of the reference axis 25 and that the mean rate of scane is $\theta$ degrees per second. An object at a distance d meters from the transmitting transducer will be irradiated T seconds following the instant at which the beam first points in the direction of the object where T is given by the equation:

$$T=(d/c)\ \text{sec}$$

c = velocity of propogation in the medium in meters/-second.

When the object lies in the direction $\theta_L$ to the left of the reference axis 25, and assuming the transmitter beam is scanned from left to right, then the time taken for the beam to scan from the lefthand boundary 12 to the direction represented by $\theta_L$ is given by the equation $$\tau=(\phi-\theta_L)/\dot{\theta} \quad (1)$$

Referring to the instant $t_o$, when the beam is in its datum position at the lefthand boundary 12, then the time t at which echo from the object at a range d and direction $\theta_L$ will arrive back at the receiving transducers is given by the equation:

$$t=t_o+2d/c+\tau=(\phi-\theta_L/\dot{\theta}) \quad (2)$$

which can be written:

$$t = t_o + 2T + \tau \quad (3)$$

The time delay 2T is converted into an indicator signal having an audio frequency somewhere in the audio range covered by the individual pass bands of the filters f1 to f7, and which conveniently is denoted as $f_a$.

This frequency is given by the equation:

$$f_a = 2dm/c$$

which can be rewritten $$f_a = 1Tm \text{ Hz} \quad (4)$$

where m is the rate of change of frequency of the transmitted signal Hz/s.

Consider now a filter in the group f1 to f7 and which is conveniently generalized as filter $f_n$, and assume that this will pass a range of frequency having a bandwidth B. The range annulus, in distance, corresponding to this filter bandwidth is given by the equation $$d_n = B/K \text{ meters} \quad (5)$$

where K is the range code for converting indicator signal frequency range to distance in Hz/meter, and is given by 2m/c.

The time taken for the wave energy to traverse this annulus is given by the following equation:

$$\Delta T = B/Kc - \text{seconds} \quad (6)$$

All objects in this range annulus are irradiated sequentially T seconds after the transmitter beam points in the direction of the object. Hence the output of the $n^{th}$ filter is representative of any object T seconds after irradiation, the echo appearing in the filter output at a time t given by equation (3).

Thus, as the transmitter beam scans, it produces echo sequences at the output of the filters f1 to f7 corresponding to objects irradiated sequentially T seconds after irradiation.

The feature of providing time delay as above described is based on a concept that equation (3) which has two unknowns can still be solved because the term 2T can be independently determined by the appropriate filter in the group f1 to f7 responding to the frequency of the indicated signal of equation (4) and the term $\tau$ is given by equation (1).

Thus, in the coordinate display means shown in FIG. 3 the circular scan of the cathode ray-tube beam is at a rate corresponding to the acoustic beam scan, and the spot is brightened by the output from the particular one or more of the filters in the group of f1 to f7 at an angular position representing the angle $\theta_L$ provided an effective delay is applied to the scanning of the cathode ray-tube beam of 2T seconds relative to the scanning of the transmitter beam.

The method of achieving this is effectively to substract the term 2T at the output of the filter assembly f1 to f7. If the maximum delay $2T_{max}$ is applied to the output of the filter f1 representing zero range, and the delay applied to each successive filter having a mid band-pass frequency of increasing value, so that the filter f7, pertaining to maximum range, is either minimum or zero delay, then the echo from all objects will appear at the outlets of the delay units d1 to d7 at the same time but delayed by 2T relative to the propogation of the transmitted wave in the direction of the object. Any difference in time will be due to the scan function $\tau$ ($\theta$). Hence display of the delayed outputs from the delay units d1 to d7 through the sampling switch 37 on the cathode ray-tube screen will produce this brightened spot at the appropriate place on the screen.

The delay applied to the direction terminal 40 by reason of the delay circuit 41 has a value equal to $2T_{max}$, and this ensures that because of the delay in unit d1, an echo received from an object of minimum range in a given sector scan, for example the first sector, will be displayed in that sector on the cathode ray-tube screen.

It will be evident that the same considerations apply where the coordinate display mean utilizes stimulation by tactile sensing as shown in FIG. 4.

With reference to the rate of transmitter beam scan, the time taken for the beam to move one beam width i.e. to irradiate an adjacent sector should not be less than is given by the following equation $$2\Delta T = 2B/Kc \quad (6)$$

This is twice the time taken for the stress wave energy to traverse a range annulus which corresponds in distance to the pass-band of any one of the filters f1 to f7 individually, and is given by the equation:

$$\Delta d = B/K - \text{meters} \quad (7)$$

This is to reduce possible ambiguity in the displayed position for two objects in the range annulus one being at the outer or rear boundary and the other being at the inner or front boundary and which are spaced angularly from each other by one beamwidth in the direction of beam scan. Too rapid a scan can result in the echo from the front edge appearing in the correct postion in the display, but the scan of the display in the dimension representing object direction will have moved on from the proper position before an echo from the rear edge of the annulus can be displayed.

Assuming that there are P range annuli represented by P-filters and Q-radiation beamwidths in the field of view $2\phi$ then to meet the limitation referred to, above the dwell of the beam in one beamwidth requires to be not less than 2B/KC.

Thus it can be seen that in the time interval $2d_{max}/c$ (which is fixed for a given maximum range) there can be $2d_{max}/C \times KC/B$ scans of the field, since $d_{max}K/B = d_{max}/dn = P$ there can be P/Q scans Referring now to the use of audible display an echo, that is a received signal, would be received by the two receiving transducers 28L 28R and these may be angled to present divergent overlapping polar lobes one to the left one to the right of the reference axis 25. The audible indicator signal developed in the respective channels I,II and fed to the left and right hand ear pieces or loudspeakers 34L 34R will have a frequency dependent on range of the object concerned. For an object which is to the left of the reference axis, that is above it as seen in FIG. 2, the indicator signal developed in channel I will have a greater amplitude than the indicator signal developed in channel II and the observer will hear the indicator signal more loudly in sound producer 34L than in sound producer 34R.

For an object at a position ($d,\theta_L$,) the relative loudness in the left and righthand sound producers will be represented by the equation $$k \text{ Log } A_L/A_R = \text{estimated } \theta_L$$

where K is the constant determining the perceived lateral position for a specified rate of change of interaural amplitude difference (IAD) with angle $\theta_L$.

The sensation for an angle $\theta_L$ will thus vary in the degree of "leftness", subjectively perceived, as k is varied. By increasing the constant k the field of view 2 $\phi$ may be auditorily perceived as a larger angle for example 6 $\phi$ in the case where the constant k is made three times that for natural auditary location and also has the advantage that discrimination ahead is improved. k may be increased by appropriate shaping of the polar diagram produced by transducers 28L 28R in combination for example by varying the lateral separation of these transducers and/or their angle of divergent display.

The duration of the indicator signal pertaining to each object and the period between incidence of similar indicator signal derived from the same object, is dependent upon the rate of scan of the transmitter beam. If the scan is too fast the echos produced will be of insufficient duration for an observer readily to appreciate the character of the object by recognition of the distinctive tone. Relatively slow scan back and forth across the object will provide useful information about its character. The scanning beam may be stopped in any direction in which an object is located as already described.

If audible display is used in combination with visual or tactile display, the observer will be able to co-relate his subjectively determined object direction with that indicated by the visual or tactile display.

It will be understood that instead of using a stepwise scan for the transmitting beam a continuous scan may be employed, the rate of the scan in this case being determined upon considerations analogous to those herein referred to in describing stepped scan operation.

The method and apparatus of the invention may be used in various fields of which the following are mentioned by way of example:

(1) Location of underwater objects from a vessel containing both visual and audible indicator means for display of information.

(2) Location and classification of underwater objects by a diver fitted with both audible and tactile indicator means, or the location of underwater objects by a diver fitted only with a tactile indicator means.

(3) Location and classification of objects by a blind person, a person with limited vision, or a sighted person operating under conditions of restricted visibility fitted with an audible indicator means alone, or in combination with a tactile indicator means.

(4) Location of objects by a blind and deaf person, or a person whose hearing and vision is impaired, fitted with a tactile indicator means.

I claim:

1. In a method of providing information as to the existence or position of objects otherwise than by direct vision comprising the steps of, radiating stress wave energy (herein called the transmitted signal) from a station to a field of view, receiving at the station at least part of the transmitted signal (such part herein being called the received signal) reflected from the object, carrying out a frequency modulation of the transmitted signal to produce a frequency difference between the received signal and a correspondingly frequency modulated locally generated signal in a mode such that the magnitude of the frequency difference represents the range of the object from the station, operating upon the received signal with the locally generated signal to produce an indicator signal of said difference frequency providing for range indication, and determining or sensing the angular position of the object with respect to a reference axis extending through the station and the field of view by observation of a characteristic of the indicator signal which is dependent upon the angular position of the object, the improvement comprising:

(a) radiating the stress wave energy into the field of view in the form of a beam, (b) moving the beam angularly from a datum position occupied at a datum time to effect scanning of the field of view successively to irradiate objects contained in successive sectors of the field of view having angular widths corresponding to that of the beam, (c) displaying indicator signals derived from the received signals due to these objects in a mode providing an indication of the sector of the field of view in which the beam is located to irradiate each object, by providing sensually perceptible stimuli spaced apart in one dimension in a manner corresponding to the scanning position of the beam, and spaced apart in another dimension in a manner corresponding to the range of the object, and wherein:

(i) indicator signals of differing frequencies derived from received signals due to objects of different ranges are subjected, before producing the stimuli, to different delays to bring them into coincident time relation at different respective receiving outlets, (ii) these outlets are subjected to sequential sampling to generate the respective spaced stimuli.

2. A method according to claim 1, wherein:

(a) reception of the received signals is by way of a receiving transducer having a wide angle receptivity characteristic covering the field of view continuously throughout the scanning thereof by the radiated wave energy, (b) the indicator signals of different frequencies are segregated to different respective receiver outlets by spectral analysis into respective frequency bands, (c) dwell, or angular transit time, of the beam in, or through, each angular position in the field is at least sufficient for reflections to be received and cause sensually perceptible stimuli from object surfaces at both the inner and outer boundaries of an imaginary annulus having a radial width corresponding to the bandwidth of the respective frequency bands transformed into a distance in the medium irradiated.

3. A method of providing information as to the existence or position of objects otherwise than by direct vision comprising the steps of, radiating stress wave energy (herein called the transmitted signal) from a station to a field of view, receiving at the station at least part of the transmitted signal (such part herein being called the received signal) reflected from the object, carrying out a frequency modulation of the transmitted signal to produce a frequency differing between the received signal and a correspondingly frequency modulated locally generated signal in a mode such that the magnitude of the frequency difference represents the range of the object from the station, operating upon the received signal with the locally generated signal to produce an indicator signal of said difference frequency providing for range indication, and determining or sensing the angular position of the object with respect to a reference axis extending through the station and the field of view by observation of a characteristic of the indicator signal which is dependent upon the angular position of the object, the improvement comprising:

(a) radiating the stress wave energy into the field of view in the form of a beam, (b) moving the beam angularly from a datum position occupied at a datum time to effect scanning of the field of view successively to irradiate objects contained in successive sectors of the field of view having angular widths corresponding to that of the beam, wherein:

(i) the display of the indicator signals is effected audibly, (ii) the indication of the sector of the field in which the object is located is effected by stopping the beam scan at a position at which the indicator signal amplitude is maximised, (iii) initial approximate determination of object direction is effected by receiving the received signals at transducers providing divergent overlapping polar lobes, and by displaying the indicator signals derived from such transducers respectively binaurally.

4. Apparatus for providing information as to the existence or position of objects otherwise than by direct vision comprising in combination:

(a) a transmitting means for transmitting frequency modulated stress wave energy (herein called the transmitted signal) from a station to a field of view and including transmitting transducer means providing a beam, (b) means providing a correspondingly frequency modulated locally generated signal, (c) scanning means for moving the beam angularly from the datum position in the field of view to effect scanning of the field of view successively to irradiate objects contained in successive sectors of the field of view, such sectors having angular widths corresponding to that of the beam, (d) receiving means at the station for receiving at least part of the wave energy (this part herein being called the received signal) reflected from an object in the field of view, (e) modulator means for producing an indicator signal at a frequency equal to the frequency difference between the received signal and the locally generated signal, frequency modulation of the transmitted and locally generated signal being in a mode such that the magnitude of the frequency difference is representative of the range of the object from the station, (f) means for feeding the received signal and the locally generated signal to the modulator means to produce therefrom said indicator signal of said difference frequency, (g) indicator means responsive to the frequency of said indicator signal to furnish observable range information, and responsive to the angular position of the beam to provide for sensory perception of the sector of the field of view in which the beam is located to irradiate each object, and wherein (i) the indicator means comprises coordinate display means providing sensually perceptible stimuli spaced apart in a first dimension in a manner corresponding to the scanning position of the beam, and spaced apart in a second dimension in a manner corresponding to the range of the object, (ii) the receiving means includes means for segregating the indicator signals, derived from the received signals due respectively to objects of different ranges, to different respective outlets, one for each range band, (iii) means are provided for subjecting the segregated indicator signals to delays differing in a manner such as to bring the indicator signals into coincident time relation, (iv) switch means are provided for sampling said outlets successively to feed the indicator signals therefrom to said coordinate display means along said second dimension.

5. Apparatus according to claim 4 wherein:

(a) the coordinate means comprises a cathode ray-tube means, (b) time base means associated operatively with the cathode ray-tube means and providing for cathode ray beam shift in coordinate directions corresponding to the direction and range of the object, (c) means operatively connecting said time base means with the scanning means and with the sampling switch means.

6. Apparatus according to claim 4 wherein:

(a) the coordinate display means comprises means providing tactile stimuli and including a plurality of stimulating elements arranged in rows representing different respective range bands, and in columns representing different respective sectors occupied by the beam, (b) the receiving means includes means for segregating indicator signals, derived from the received signals due respectively to objects of different ranges, to different respective outlets one for each range band, said outlets being connected operatively respectively with said rows of stimulating elements, (c) said coordinate display means further comprises time base means having an inlet connected to said scanning means and responsive to provide at a plurality of outlets of said time base means signals representing different sectors of beam position said outlets being connected respectively to said columns.

7. Apparatus for providing information as to the existence or position of objects otherwise than by direct vision comprising in combination:

(a) a transmitting means for transmitting frequency modulated stress wave energy (herein called the transmitted signal) from a station to a field of view and including transmitting transducer means providing a beam, (b) means providing a correspondingly frequency modulated locally generated signal, (c) scanning means for moving the beam angularly from the datum position in the field of view to effect scanning of the field of view successively to irradiate objects contained in successive sectors of the field of view, such sectors having angular widths corresponding to that of the beam, (d) receiving means at the station for receiving at least part of the wave energy (this part herein being called the received signal) reflected from an object in the field of view, (e) modulator means for producing an indicator signal at a frequency equal to the frequency difference between the received signal and the locally generated signal, said frequency modulation being in a mode such that the magnitude of the frequency difference is representative of the range of the object from the station, (f) means for feeding the received signal and the locally generated signal to the modulator means to produce therefrom said indicator signal of said difference frequency, (g) indicator means responsive to the frequency of said indicator signal to furnish observable range information, and responsive to the angular position of the beam to provide for sensory perception of the sector of the field of view in which the beam is located to irradiate each object, and wherein:

(i) the indicator means comprises sound reproducing means providing an audible display, (ii) the scanning means includes means for stopping the scanning of the beam at a position in which the amplitude of the indicator signal is maximised, (iii) the receiving means includes receiving transducer means providing respective divergent overlapping polar lobes, binaural sound reproducing means, means defining channels connected respectively between said receiving transducer means and said binaural sound reproducing means.

8. In a method of providing information as to the existence or position of objects otherwise than by direct vision comprising the steps of, radiating stress wave energy (herein called the transmitted signal) from a station to a field of view, receiving at the station at least part of the transmitted signal (such part herein being called the received signal) reflected from the object, carrying out a frequency modulation of the transmitted signal to produce a frequency difference between the received signal and a correspondingly frequency modulated locally generated signal in a mode such that the magnitude of the frequency difference represents the range of the object from the station, operating upon the received signal with the locally generated signal to produce an indicator signal of said difference frequency providing for range indication, and determining or sensing the angular position of the object with respect to a reference axis extending through the station and the field of view by observation of a characteristic of the indicator signal which is dependent upon the angular position of the object, the improvement comprising:

(a) radiating the stress wave energy into the field of view in the form of a beam, (b) moving the beam angularly from a datum position occupied at a datum time to effect scanning of the field of view successively to irradiate objects contained in successive sectors of the field of view having angular widths corresponding to that of the beam, (c) displaying indicator signals derived from the received signals due to these objects, said indicator signals including sensually perceptible stimuli spaced apart in one dimension in a manner corresponding to the scanning position of the beam, and spaced apart in another dimension in a manner corresponding to the range of the object, and (d) compensating for the transit time of the transmitted and received signals in the field of view before display of the indicator signals.

9. A method according to claim 8 wherein compensation for the transit time of the transmitted and received signals comprises:

(a) subjecting those of the indicator signals which are of differing frequencies derived from received signals due to objects of different ranges to respectively different delays substantially to compensate for respective transit times of the wave energy in the field of view out to and back from said objects, (b) subjecting said indicator signal after said compensation to sequential sampling to generate said stimuli which are spaced apart in a manner corresponding to the respective ranges of said objects.

10. Apparatus for providing information as to the existence or position of objects otherwise than by direct vision comprising in combination:

(a) a transmitting means for transmitting frequency modulated stress wave energy (herein called the transmitted signal) from a station to a field of view and including transmitting transducer means providing a beam, (b) means providing a corresponding frequency modulated locally generated signal, (c) scanning means for moving the beam angularly from the datum position in the field of view to effect scanning of the field of view successively to irradiate objects contained in successive sectors of the field of view, such sectors having angular widths corresponding to that of the beam, (d) receiving means at the station for receiving at least part of the wave energy (this part herein being called the received signal) reflected from an object in the field of view, (e) modulator means for producing an indicator signal at a frequency equal to the frequency difference between the received signal and the locally generated signal, said frequency modulation being in a mode such that the magnitude of the frequency difference is representative of the range of the object from the station, (f) means for feeding the received signal and the locally generated signal to the modulator means to produce therefrom said indicator signal of said difference frequency, (g) indicator means including coordinate display means responsive to respective ones of said indicator signals to provide sensually perceptible stimuli spaced apart in a first dimension in a manner corresponding to the scanning position of the beam and spaced apart in a second dimension in a manner corresponding to the ranges of the object producing said respective indicator signals, and (h) means for compensating for the transmit time of the transmitted and received signals in the field of view before display.

11. Apparatus according to claim 10 wherein:

(a) the receiving means includes means for segregating the indicator signals, derived from the received signals due respectively to objects of different ranges, to different respective outlets, one for each range band, (b) means are provided for subjecting the segregated indicator signals to differing delays substantially to compensate for respective transit times of the wave energy in the field of view out to and back from said objects in said differing range bands, (c) switch means are provided for sampling said outlets successively to feed the indicator signals therefrom to said coordinate display means for display spaced apart in said second dimension.

12. Apparatus for providing information as to the existence or position of objects otherwise than by direct vision comprising in combination:

(a) a transmitting means for transmitting frequency modulated stress wave energy (herein called the transmitted signal) from a station to a field of view and including transmitting transducer means providing a beam, (b) means for providing a correspondingly frequency modulated locally generated signal, (c) scanning means for moving the beam angularly from the datum position in the field of view to effect scanning of the field of view successively to irradiate objects contained in successive sectors of the field of view, such sectors having angular widths corresponding to that of the beam, (d) receiving means at the station for receiving at least part of the wave energy (this part herein being called the received signal) reflected from an object in the field of view, (e) modulating means for producing an indicator signal at a frequency equal to the frequency difference between the received signal and the locally generated signal, frequency modulation of the transmitted and locally generated signal being in a mode such that the magnitude of the frequency difference is representative of the range of the object from the station, (f) means for feeding the received signal and the locally generated signal to the modulating means to produce therefrom said indicator signal of said difference frequency, and (g) indicator means responsive to the frequency of said indicator signals to furnish observable range information, and responsive to the angular position of the beam to provide for sensory perception of the sector of the field of view in which the beam is located while irradiating each object, wherein (h) the receiving means includes receiving transducer means having a wide angle receptivity characteristic covering the field of view, (i) the receiving means further includes frequency spectrum analyzing means for segregating the indicator signals derived from the received signals due to objects of different ranges to different respective outlets of the receiving means each pertaining to a different respective band of frequencies, and (j) the scanning means provides for a dwell, or transit time, of the beam in, or through, each of its angular positions in the field, at least sufficient for received signals to be received by said receiving transducer means and cause sensually perceptible stimuli from object surfaces at both inner and outer boundaries of an imaginary annulus having a radial width corresponding to the band width of the respective frequency bands transformed into a distance in the medium irradiated.

*13. In a method of providing information as to the existence or position of objects otherwise than by direct vision comprising the steps of, radiating stress wave energy (herein called the transmitted signal) from a station to a field of view, receiving at the station at least part of the transmitted signal (such part herein being called the received signal) reflected from the object, carrying out a frequency modulation of the transmitted signal to produce a frequency difference between the received signal and a correspondingly frequency modulated locally generated signal in a mode such that the magnitude of the frequency difference represents the range of the object from the station, operating upon the received signal with the locally generated signal to produce an indicator signal of said difference frequency providing for range indication, and determining or sensing the angular position of the object with respect to a reference axis extending through the station and the field of view by utilization of a characteristic of the indicator signal which is dependent upon the angular position of the object, the improvement comprising:*

*(a) radiating the stress wave energy into the field of the view in the form of a beam,*

*(b) moving the beam angularly from a datum position occupied at a datum time to effect scanning of the field of view successively to irradiate objects contained in successive sectors of the field of view having angular widths corresponding to that of the beam,*

*(c) operating on indicator signals derived from the received signals due to these objects, to segregate said indicator signals in a manner corresponding to the scanning position of the beam, and in another manner corresponding to the range of the object, and*

*(d) compensating for the transit time of the transmitted and received signals in the field of view.*

*14. A method according to claim 13 wherein compensation for the transit time of the transmitted and received signals comprises:*

*(a) subjecting those of the indicator signals which are of differing frequencies derived from received signals due to objects of different ranges to respectively different delays substantially to compensate for respective transit times of the wave energy in the field of view out to and back from said objects,*

*(b) subjecting said indicator signal after said compensation to sequential sampling to effect segregation in a manner corresponding to the respective ranges of said objects.*

*15. Apparatus for providing information as to the existence or position of objects otherwise than by direct vision comprising in combination:*

*(a) a transmitting means for transmitting frequency modulated stress wave energy (herein called the transmitted signal) from a station to a field of view and including transmitting transducer means providing a beam,*

*(b) means providing a corresponding frequency modulated locally generated signal,*

*(c) scanning means for moving the beam angularly from the datum position in the field of view to effect scanning of the field of view successively to irradiate objects contained in successive sectors of the field of view, such sectors having angular widths corresponding to that of the beam,*

*(d) receiving means at the station for receiving at least part of the wave energy (this part herein being called the received signal) reflected from an object in the field of view,*

*(e) modulator means for producing an indicator signal at a frequency equal to the frequency difference between the received signal and the locally generated signal, said frequency modulation being in a mode such that the magnitude of the frequency difference is*

*representative of the range of the object from the station,*

*(f) means for feeding the received signal and the locally generated signal to the modulator means to produce therefrom said indicator signal of said difference frequency,*

*(g) means for operating upon respective ones of said indicator signals to provide segregation in a first manner corresponding to the scanning position of the beam and in a second manner corresponding to the ranges of the object producing said respective indicator signals, and*

*(h) means for compensating for the transmit time of the transmitted and received signals in the field of view.*

*16. Apparatus according to claim 15 wherein:*

*(a) said means for operating upon said indicator signals includes means for segregating the indicator signals, derived from the received signals due respectively to objects of different ranges, to different respective outlets, one for each range band,*

*(b) means are provided for subjecting the segregated indicator signals to differing delays substantially to compensate for respective transit times of the wave energy in the field of view out to and back from said objects in said differing range bands,*

*(c) switch means are provided for sampling said outlets successively to feed the indicator signals therefrom to means to segregate said indicator signals in said second manner.*

*17. Apparatus for providing information as to the existence or position of objects otherwise than by direct vision comprising in combination:*

*(a) a transmitting means for transmitting frequency modulated stress wave energy (herein called the signal) from a station to a field of view and including transmitting transducer means providing a beam,*

*(b) means for providing a correspondingly frequency modulated locally generated signal,*

*(c) scanning means for moving the beam angularly from the datum position in the field of view to effect scanning of the field of view successively to irradiate objects contained in successive sectors of the field of view, such sectors having angular widths corresponding to that of the beam,*

*(d) receiving means at the station for receiving at least part of the wave energy (this part herein being called the received signal) reflected from an object in the field of view,*

*(e) modulating means for producing an indicator signal at a frequency equal to the frequency difference between the received signal and the locally generated signal, frequency modulation of the transmitted and locally generated signal being in a mode such that the magnitude of the frequency difference is representative of the range of the object from the station,*

*(f) means for feeding the received signal and the locally generated signal to the modulating means to produce therefrom said indicator signal of said difference frequency, and*

*(g) means for operating upon said indicator signals responsive to the frequency of said indicator signals to furnish range determination, and responsive to the angular position of the beam to provide determination of the sector of the field of view in which the beam is located while irradiating each object, wherein*

*(h) the receiving means includes receiving transducer means having a wide angle receptivity characteristic covering the field of view,*

*(i) the means for operating upon said indicator signals further includes frequency spectrum analyzing means for segregating the indicator signals derived from the received signals due to objects of different ranges to different respective outlets of the receiving means each pertaining to a different respective band of frequencies, and*

*(j) the scanning means provides for a dwell, or transit time, of the beam in, or through, each of its angular positions in the field, at least sufficient for received signals to be received by said receiving transducer means and produce indicator signals from object surfaces at both inner and outer boundaries of an imaginary annulus having a radial width corresponding to the band width of the respective frequency bands transformed into a distance in the medium irradiated.*

* * * * *